(12) United States Patent
Wu

(10) Patent No.: US 7,931,451 B2
(45) Date of Patent: Apr. 26, 2011

(54) FRAME FLOOR PUMP HAVING UNIVERSAL JOINT UNIT

(76) Inventor: Scott Wu, Taichung Hsien (TW)

( * ) Notice: Subject to any disclaimer, the term of this patent is extended or adjusted under 35 U.S.C. 154(b) by 981 days.

(21) Appl. No.: 11/756,033

(22) Filed: May 31, 2007

(65) Prior Publication Data

US 2008/0179879 A1 Jul. 31, 2008

(30) Foreign Application Priority Data

Jan. 31, 2007 (TW) .............................. 96103558 A

(51) Int. Cl.
*F04B 53/00* (2006.01)
(52) U.S. Cl. ...................................... 417/234
(58) Field of Classification Search .................. 417/234, 417/544; 403/74, 122; 137/223
See application file for complete search history.

(56) References Cited

U.S. PATENT DOCUMENTS

| | | | | |
|---|---|---|---|---|
| 1,931,122 A * | 10/1933 | Zerk | ........................... | 141/311 R |
| 2,243,648 A * | 5/1941 | Patton et al. | ................... | 417/440 |
| 2,439,796 A * | 4/1948 | Dearsley | ....................... | 417/427 |
| 3,168,872 A * | 2/1965 | Pinkerton | ..................... | 417/492 |
| 4,615,802 A * | 10/1986 | Harbaugh | ................ | 210/167.16 |
| 5,347,913 A * | 9/1994 | Stepner | ........................... | 92/58.1 |
| 5,423,560 A * | 6/1995 | Warrick et al. | ................ | 280/216 |
| 5,683,234 A * | 11/1997 | Chuang et al. | ................ | 417/531 |
| 5,947,706 A * | 9/1999 | Gapinski | ....................... | 417/437 |
| 6,558,129 B2 * | 5/2003 | Wang | .............................. | 417/63 |

FOREIGN PATENT DOCUMENTS

CA 2276388 A1 * 12/1999

OTHER PUBLICATIONS

TW M 278776, 4 pages.

* cited by examiner

*Primary Examiner* — Devon C Kramer
*Assistant Examiner* — Amene S Bayou
(74) *Attorney, Agent, or Firm* — Alan Kamrath; Kamrath & Associates PA

(57) ABSTRACT

A frame floor pump having a universal joint unit includes a cylinder defining a through hole on an end thereof, an universal joint unit including a shaft received in the through hole of the cylinder, a joint having a first end connecting to the shaft and a second end, and a pipe forming a connecting portion extending therefrom and mounted in the second end of the joint. The joint drives the shaft to turn in the through hole of the cylinder and pivots to various positions with the connecting portion. Hence, the universal joint unit could pivot to any position as a requirement of users.

10 Claims, 6 Drawing Sheets

FRAME FLOOR PUMP HAVING UNIVERSAL JOINT UNIT

BACKGROUND OF INVENTION

1. Field of the Invention

The present invention relates to a frame floor pump. In particular, the present invention relates to a frame floor pump having a universal joint unit.

2. Description of the Related Art

The conventional pumps generally comprise three kinds: pump, mini pump and frame floor pump. The floor pump is too big and not easy to carry. The mini pump is effortless to carry, but there is no holder so it is not easy to apply force while inflating. However, the frame floor pump is easy to stow and has a holder to apply force.

The frame floor pump still needs an improvement, Taiwan patent NO. M278776 which discloses a frame floor pump including a collapsible pedal, a collapsible handle and a pipe. The pipe could not be curved so that the pump needs to be close to the bicycle for easily operating while inflating. However, the pump is too near the bicycle to be easy to force and quickly inflate.

SUMMARY OF THE INVENTION

It is therefore the purpose of this invention to provide a frame floor pump having a universal joint unit and including a cylinder defining a through hole on an end thereof, a universal joint unit having a shaft received in the through hole of the cylinder, a joint defining a first end and a second end, a pipe including a connecting portion extending therefrom, and a cover combining with the connecting portion. The first end of the joint combines with the shaft, and the second end mounts on the connecting portion of the pipe.

As the joint combines to the shaft and the connecting portion combines to the joint, the joint could drive the shaft to pivot in the through hole, and the connecting portion could drive the cover to pivot with the joint.

Other advantages and features of the invention will become more apparent from the following detailed description when taken in conjunction with the accompanying drawings.

DETAILED DESCRIPTION OF THE PREFERRED EMBODIMENT

Figure 1:
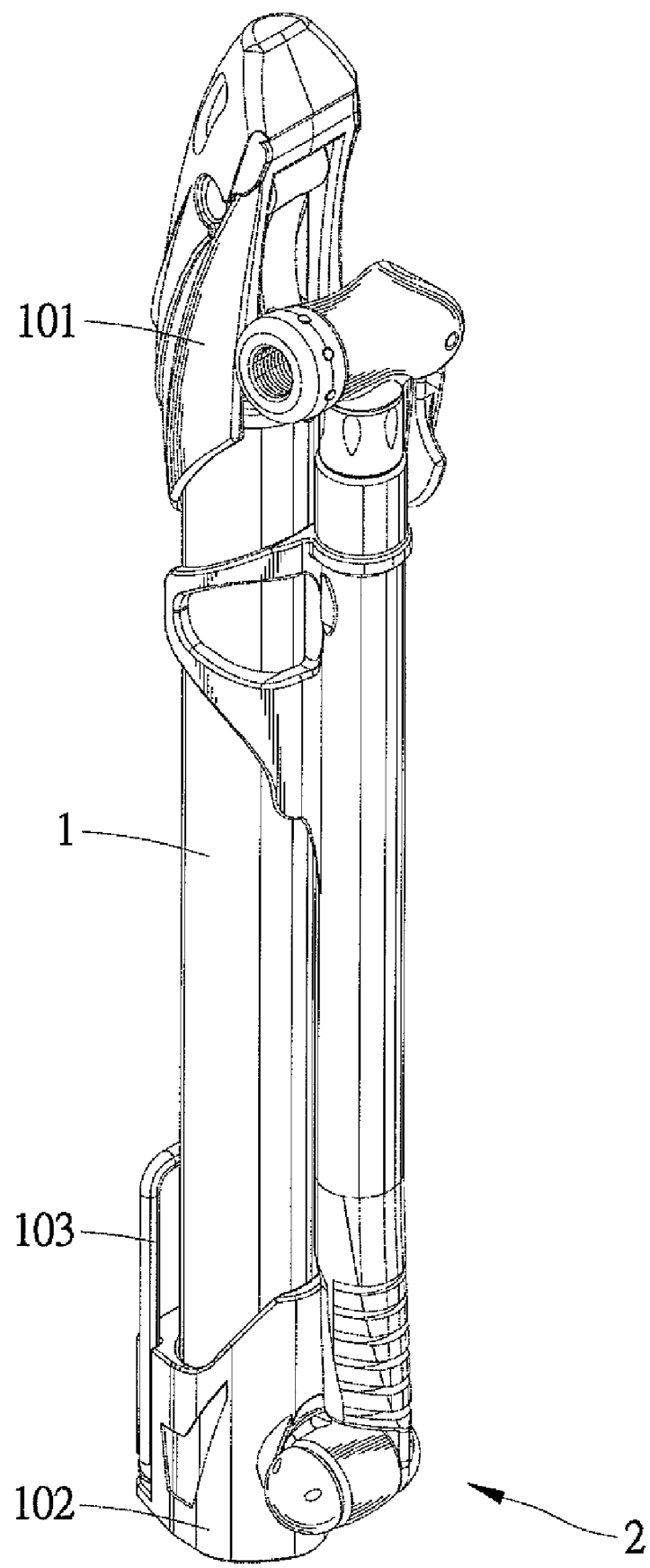
FIG. 1 is a perspective view of a frame floor pump having a universal joint unit in accordance with the present invention.
Figure 2:
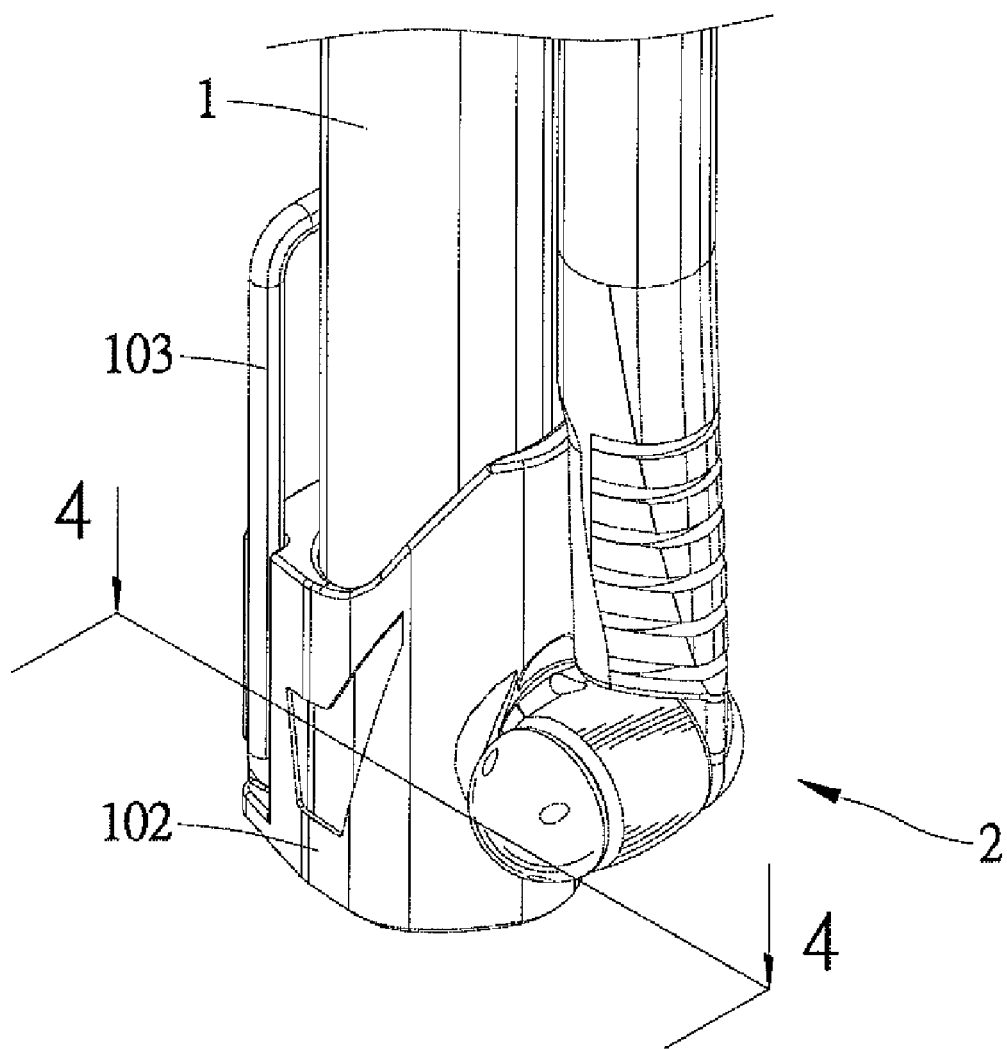
FIG. 2 is a partial enlarged view in accordance with FIG. 1.

Referring to FIGS. 1 and 2, a frame floor pump includes a cylinder 1. A handle 101 is formed on a first end of the cylinder 1, and a base 102 is installed on a second end of the cylinder 1. A pedal 103 is disposed on one side of the base 102, and a universal joint unit 2 is installed in another side of the base 102. Both the handle 101 and the pedal 103 are collapsible and easy for a user to stow the frame floor pump.

In operation, a user steps on the pedal 103, holds on the handle 101 and draws air from the cylinder 1. The universal joint unit 2 could pivot to various positions so that the pump is easy to operate for inflating.

Figure 3:
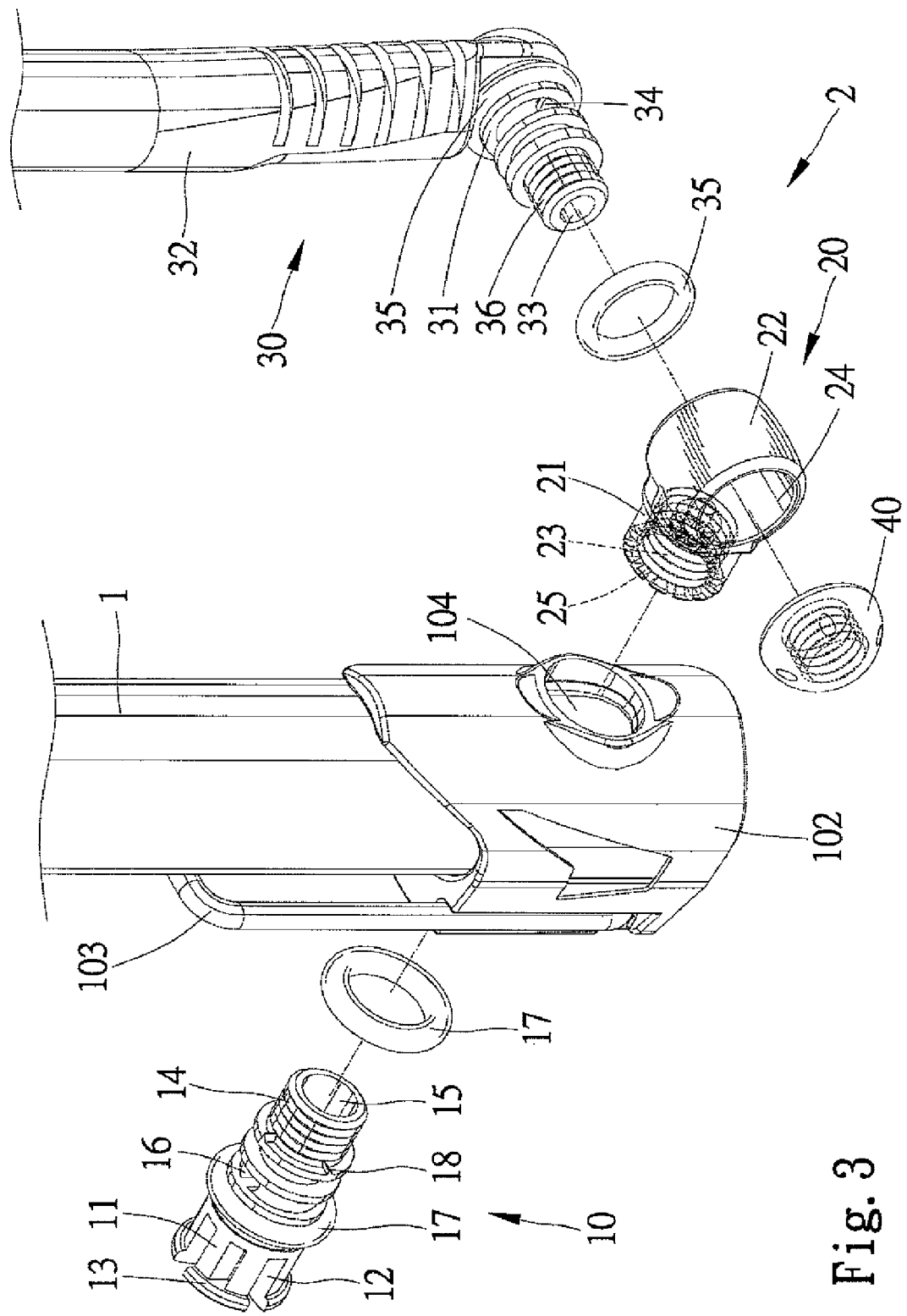
FIG. 3 is an exploded view in accordance with FIG. 2.
Figure 4:
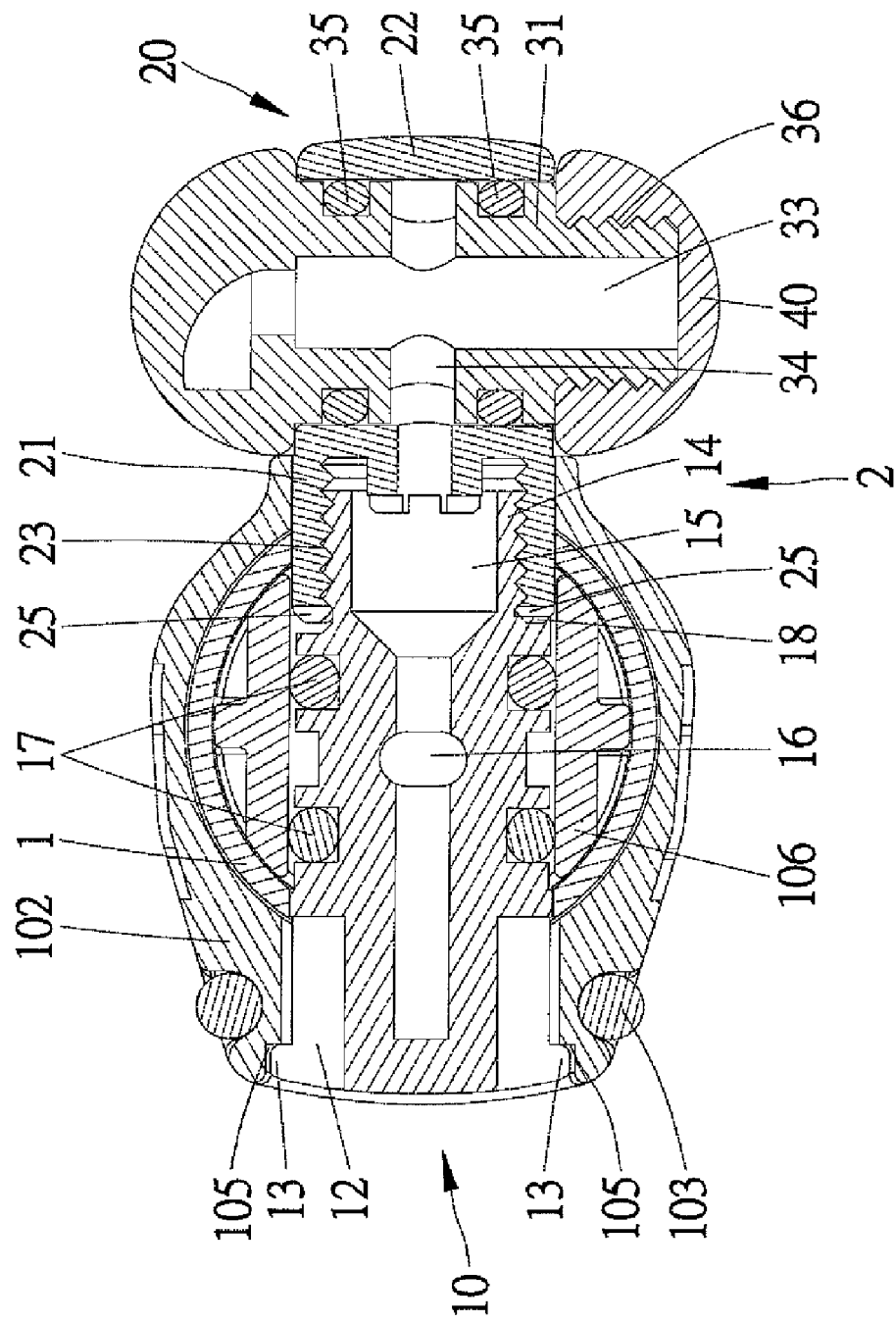
FIG. 4 is a cross-sectional view taken along 4-4 in FIG. 2.

Referring to FIGS. 3 and 4, a radial through hole 104 is defined in the second end of the cylinder 1. An edge 105 forms on an end of the radial through hole 104, and a piston head 106 mounts in the interior of the cylinder 1 and achieves an airproof effect. The universal joint unit 2 includes a shaft 10, and a fixed end 11 is formed on an end of the shaft 10. A plurality of recesses 12 is axially defined around the fixed end 11. Hence, the fixed end 11 is flexible and handy to fix in the through hole 104 of the cylinder 1. A flange 13 protrudes from the distal end of the fixed end 11, and said flange 13 exactly abuts against the edge 105. A combining end 14 is defined on an end of the shaft 10 opposite to the fixed end 11, and said combining end 14 preferably has external thread. A channel 15 is axially formed on the shaft 10, and said channel 15 is open near the combining end 14 and closed near the fixed end 11. A hole 16 is radially defined through the shaft 10 and said hole 16 intercommunicates to the channel 15. Two airproof sections 17 are installed on the body of the shaft 10 and exactly seal up the shaft 10 for avoiding air leaking. A plurality of lugs 18 are formed around the combining end 14 and are preferably ratcheted.

A joint 20 includes a first end 21 longitudinally defining a first channel 23 in the interior thereof and a second end 22 transversely defining a second channel 24 in the interior thereof. Two ends of the second channel 24 are open, and the first and second channels 23, 24 are perpendicular to each other and intercommunicate. The first channel 23 of the first end 21 further has internal thread and exactly engages to the combining end 14 of the shaft 10. A plurality of lugs 25 are formed around the distal end of the first end 21 and are square shaped. The internal thread of the first channel 23 engages with the external thread of the combining end 14. When locking, the lugs 25 exactly fix to the lugs 18 of the shaft 10. Because the shaft 10 rotatably engages to the joint 20 so that when a user pivots the joint 20 for operating, the shaft 10 could be driven to rotate with the joint 20 simultaneously.

A pipe 30 includes a connecting portion 31 extending from an end thereof and a pipe body 32 on another end thereof. The interior of the connecting portion 31 forms an axial channel 33 intercommunicating to the pipe body 32 and a radial hole 34. Two airproof sections 35 are respectively installed on the connecting portion 31 along two sides of the hole 34 for avoiding air leaking from the pump. A combining end 36 is defined on the connecting portion 31 and is preferably externally threaded. A cover 40 engages to the combining end 36 and has an internal thread. Hence, the cover 40 could fix with the pipe 30.

Figure 5:
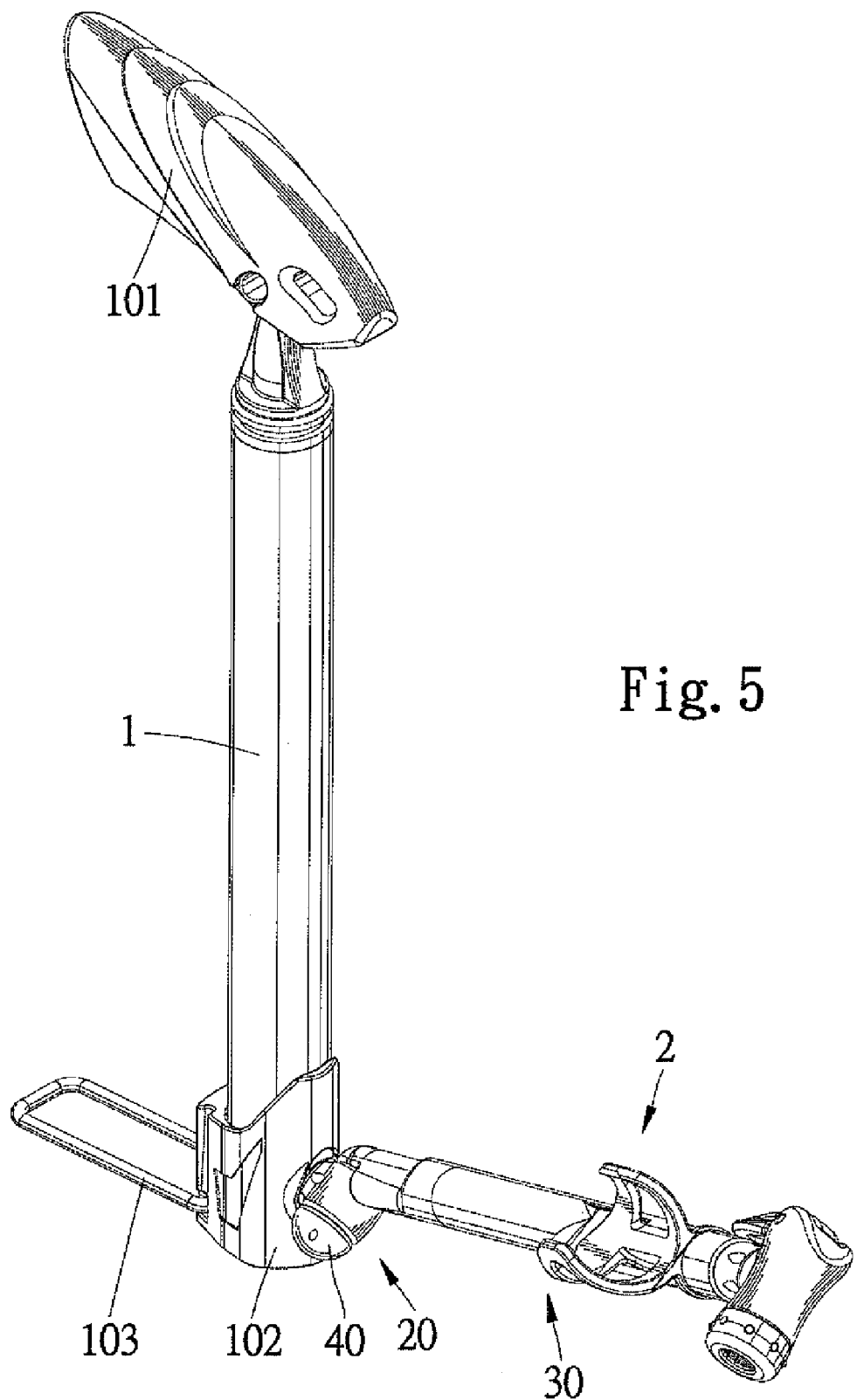
FIG. 5 is a perspective view of operating a frame floor pump having a universal joint unit in accordance with the present invention.
Figure 6:
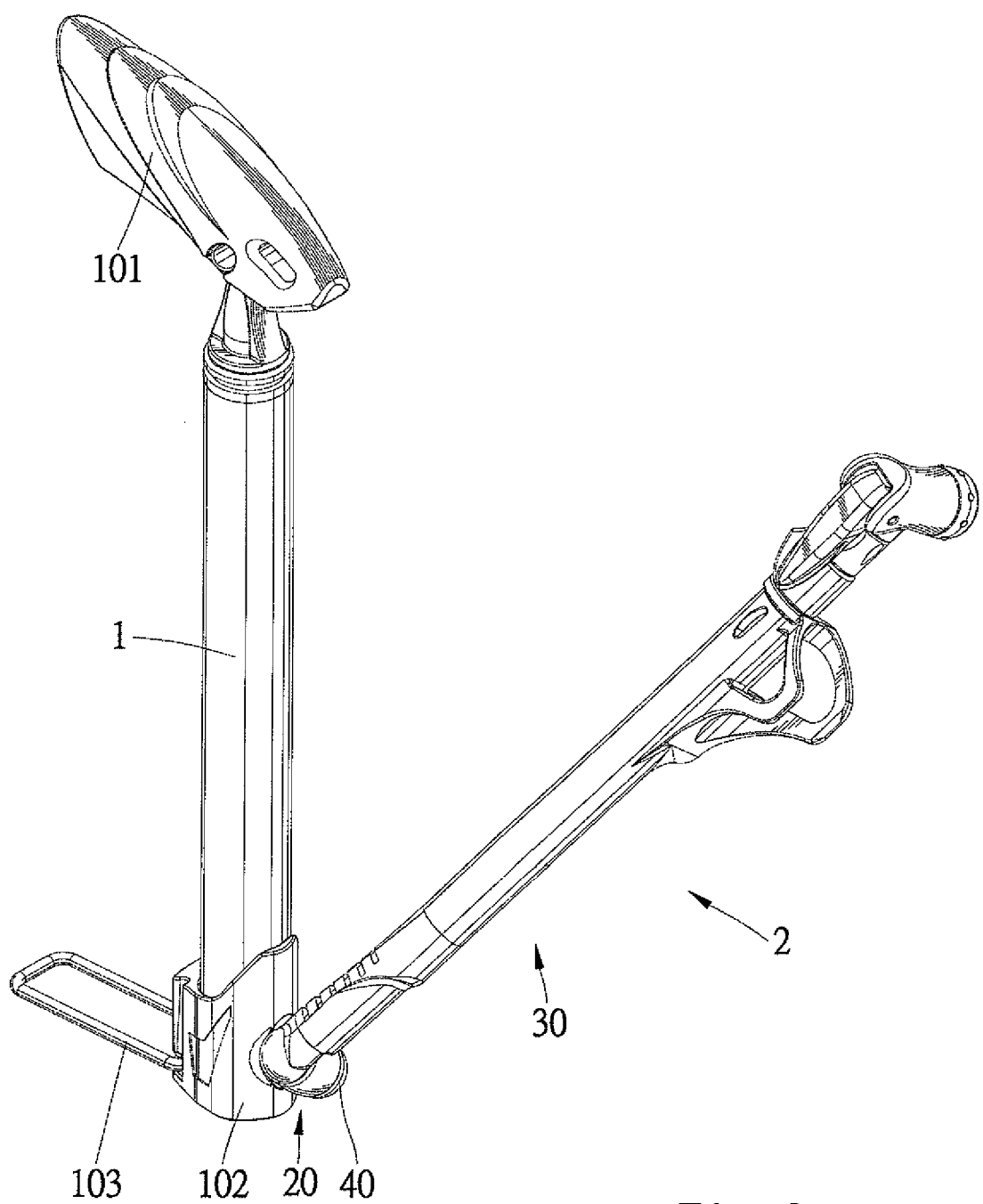
FIG. 6 is a perspective view of a operating a frame floor pump having a universal joint unit in accordance with the present invention.

Referring to FIGS. 5 and 6, before a user operates the pump to inflate with the tire, the collapsed handle 101 and pedal 103 are opened. When inflating the tire, the user could step on the pedal 103 and hold the handle 101 for operating the pump. Here, the universal joint unit 2 is removed from the cylinder 1, and the universal joint unit 2 could pivot to various positions. The joint 20 could pivot to various positions and the pipe 30 could pivot to various positions opposite to the joint 20. Therefore, when operating the pump, the pump is not needed to be close to the bicycle tire. In the reasonable distance range between the pump and the tire, the pump could be in various positions, while the universal joint unit pivots to the adaptable position for operating to inflate the tire.

Summarizing the above-mentioned, the advantages of the present invention are:

1. In the present invention, the frame floor pump includes a universal joint unit which could pivot to various positions so that the pipe could adjust to a befitting position for inflating the tire. Therefore, the pump does not need to be too close to the tire, and it would be easy to apply a force for operating.

2. In the present invention, the handle, the pedal and the universal joint unit are all collapsible. Hence, the frame floor pump is easy to stow. Further, the pedal could be a holder for a user to step on while operating the pump.

Although a specific embodiment has been illustrated and described, numerous modifications and variations are still possible. The scope of the invention is limited by the accompanying claims.

What is claimed is:

1. A frame floor pump comprising:
    a cylinder defining a through hole on a lower end thereof and having an axis;
    a universal joint unit including a shaft rotatably received in the through hole of the cylinder, a joint having a first end connecting to a first end of the shaft and a second end, and a pipe forming a connecting portion rotatably mounted in the second end of the joint, wherein an edge is formed in an interior of the through hole of the cylinder, wherein a fixing end is defined on a second end of the shaft via which the shaft is fixed and fixing in the through hole, and wherein a flange is formed on the distal end of the fixing end and abuts against the edge of the interior of the through hole, with the shaft including an axial channel extending from the first end towards but spaced from the second end, with the first end being opposite to the second end, with the pipe intercommunicating with the axial channel, with the joint driving the shaft to rotate about the axis in the through hole of the cylinder and pivoting to various positions with the connecting portion, and with the universal joint unit pivoting to any position as a requirement of users.

2. A frame floor pump as claimed in claim 1, wherein the shaft includes a plurality of lugs, and wherein the joint includes a plurality of lugs fixing with the plurality of lugs of the shaft.

3. A frame floor pump as claimed in claim 2, wherein the plurality of lugs of the shaft are ratcheted and the plurality of lugs of the joint are square shaped.

4. A frame floor pump as claimed in claim 1, wherein the universal joint unit comprises a cover combining with the connecting portion and being driven by the connecting portion.

5. A frame floor pump as claimed in claim 4, wherein the fixing end axially defines at least one recess.

6. A frame floor pump as claimed in claim 1, wherein the shaft includes a radial hole intercommunicating with the axial channel; wherein an airproof section is respectively installed by two sides of the radial hole for avoiding air leakage.

7. A frame floor pump as claimed in claim 1, wherein the first end of the joint forms a first channel, wherein the second end of the joint forms a second channel intercommunicating with the first channel, wherein the first channel intercommunicates with the axial channel, wherein the connecting portion is received in the second channel, and wherein the first and second channels are perpendicular to each other.

8. A frame floor pump as claimed in claim 7, wherein the connecting portion includes an axial channel and a radial hole intercommunicating with the axial channel of the connecting portion; wherein the axial channel and the radial hole of the connecting portion are perpendicular to each other.

9. A frame floor pump as claimed in claim 8, wherein an airproof section respectively is installed by two sides of the radial hole of the connecting portion for avoiding air leakage.

10. A frame floor pump as claimed in claim 1, wherein the cylinder includes a handle on an upper end thereof and a pedal on the lower end thereof, with the upper end being opposite to the lower end.

\* \* \* \* \*